US012009006B2

(12) United States Patent
Chen et al.

(10) Patent No.: US 12,009,006 B2
(45) Date of Patent: Jun. 11, 2024

(54) AUDIO SIGNAL PROCESSING METHOD, APPARATUS AND DEVICE, AND STORAGE MEDIUM

(71) Applicant: Tencent Technology (Shenzhen) Company Limited, Shenzhen (CN)

(72) Inventors: Rilin Chen, Shenzhen (CN); Kaiyu Jiang, Shenzhen (CN); Weiwei Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 178 days.

(21) Appl. No.: 17/741,285

(22) Filed: May 10, 2022

(65) Prior Publication Data

US 2022/0270631 A1 Aug. 25, 2022

Related U.S. Application Data

(63) Continuation of application No. PCT/CN2021/098085, filed on Jun. 3, 2021.

(30) Foreign Application Priority Data

Jul. 17, 2020 (CN) ......................... 202010693891.9

(51) Int. Cl.
*G10L 21/02* (2013.01)
*G10L 21/003* (2013.01)
(Continued)

(52) U.S. Cl.
CPC ........ *G10L 21/0364* (2013.01); *G10L 21/003* (2013.01); *H04R 1/406* (2013.01); *H04R 3/005* (2013.01); *H04R 2430/20* (2013.01)

(58) Field of Classification Search
CPC ..... H04M 1/6033; H04R 1/406; H04R 3/005; H04R 25/407; H04R 2430/20;
(Continued)

(56) References Cited

U.S. PATENT DOCUMENTS 5,353,376 A 10/1994 Oh et al.
6,034,378 A * 3/2000 Shiraishi .............. G03F 9/7049
250/237 G (Continued)

FOREIGN PATENT DOCUMENTS

CN 1753084 A 3/2006
CN 101192411 A 6/2008

(Continued)

OTHER PUBLICATIONS

Tencent Technology, WO, PCT/CN2021/098085, Aug. 23, 2021, 4 pgs.

(Continued)

*Primary Examiner* — Md S Elahee
(74) *Attorney, Agent, or Firm* — Morgan, Lewis & Bockius LLP

(57) ABSTRACT

An electronic device obtains audio signals collected by different microphones in a microphone array. The device filters the audio signals using a first filter to obtain a first target beam. The first filter is configured to suppress an interference speech in the audio signals and enhance a target speech in the audio signals. The device filters the audio signals using a second filter to obtain a first interference beam. The second filter is configured to suppress the target speech and enhance the interference speech. The device a second interference beam of the first interference beam using a third filter. The device determines a difference between the first target beam and the second interference beam as a first audio processing output. The device adap- (Continued)

tively updates at least one of the second filter and the third filter, and updates the first filter according to the updated second filter and/or third filter.

20 Claims, 9 Drawing Sheets

(51) Int. Cl.
*G10L 21/0364* (2013.01)
*H04R 1/40* (2006.01)
*H04R 3/00* (2006.01)

(58) Field of Classification Search
CPC .............. H04R 2201/40; G10L 21/003; G10L 21/0364; G10L 2021/02166; G10L 21/0208; H04B 17/40; G03F 9/7049
USPC .......................................................... 704/225
See application file for complete search history.

(56) References Cited

U.S. PATENT DOCUMENTS

| | | | | |
|---|---|---|---|---|
| 7,346,175 B2 * | 3/2008 | Hui | ..................... | H04M 1/6033 381/74 |
| 2018/0182392 A1 | 6/2018 | Li et al. | | |

FOREIGN PATENT DOCUMENTS

| | | | | | |
|---|---|---|---|---|---|
| CN | 102664023 A | | 9/2012 | | |
| CN | 102831898 A | | 12/2012 | | |
| CN | 105489224 A | | 4/2016 | | |
| CN | 110120217 A | | 8/2019 | | |
| CN | 110265054 A | | 9/2019 | | |
| CN | 110503971 A | | 11/2019 | | |
| CN | 110517702 A | | 11/2019 | | |
| CN | 110706719 A | | 1/2020 | | |
| CN | 111770379 A | | 10/2020 | | |
| CN | 111798860 A | | 10/2020 | | |
| EP | 1617419 A2 | | 1/2006 | | |
| EP | 1640971 A1 | | 3/2006 | | |
| JP | 2006094522 A | | 4/2006 | | |
| JP | 2007513530 A | | 5/2007 | | |
| KR | 20070087533 A | * | 8/2007 | ............. | H04R 1/406 |
| WO | WO2014024248 A1 | | 7/2016 | | |

OTHER PUBLICATIONS

Tencent Technology, IPRP, PCT/CN2021/098085, Jan. 17, 2023, 5 pgs.

Barry D. Van Veen et al., "Beamforming: A Versatile Approach to Spatial Filtering", IEEE ASSP Magazine, Apr. 1988, 21 pgs.

Tencent Technology, Extended European Search Report and Supplementary Search Report, EP21842054.5, dated Aug. 14, 2023, 8 pgs.

Tencent Technology (Shenzhen) Company Limited, JP2022538830, Decision to Grant a Patent, dated Jul. 24, 2023, 5 pgs.

Mikhail Stolbov et al., "Speech Enhancement with Microphone Array Using Frequency-Domain Alignment Technique", Audio Engineering Society Conference: 54th International Conference: Audio Forensics, Jun. 12, 2014, 6 pgs., Retrieved from the Internet: https://www.researchgate.net/publication/272421053_Speech_Enhancement_with_Microphone_Array_Using_Frequency-Domain_Alignment_Technique.

Tencent Technology, ISR, PCT/CN2021/098085, Aug. 23, 2021, 2 pgs.

* cited by examiner (1)

(2)

(3)

AUDIO SIGNAL PROCESSING METHOD, APPARATUS AND DEVICE, AND STORAGE MEDIUM

CROSS-REFERENCE TO RELATED APPLICATIONS

This application is a continuation application of PCT Patent Application No. PCT/CN2021/098085, entitled "AUDIO SIGNAL PROCESSING METHOD, DEVICE, EQUIPMENT, AND STORAGE MEDIUM" filed on Jun. 3, 2021, which claims priority to Chinese Patent Application No. 202010693891.9, filed with the State Intellectual Property Office of the People's Republic of China on Jul. 17, 2020, and entitled "AUDIO SIGNAL PROCESSING METHOD, APPARATUS AND DEVICE, AND STORAGE MEDIUM", all of which are incorporated herein by reference in their entirety.

FIELD OF THE TECHNOLOGY

This application relates to the field of speech processing, and particularly to an audio signal processing technology.

BACKGROUND OF THE DISCLOSURE

In voice communication, a voice signal collected by a microphone tends to be disturbed by external environmental noise. Speech enhancement technology is an important branch of speech signal processing. It is widely used in the fields of noise suppression, speech compression coding and speech recognition in noisy environments, etc., and plays an increasingly important role in solving the problem of speech noise pollution, improving speech communication quality, speech intelligibility and speech recognition rate, and other aspects.

In a related art, speech enhancement is performed using a generalized sidelobe canceller (GSC) algorithm. In GSC, a filter is pre-designed by convex optimization, and interferences are eliminated by the filter, thereby achieving higher beam performance.

The method in the related art uses a pre-designed filter and does not take into account the influence of the movement of the interfering sound source on the processing result, resulting in a sound source separation effect.

SUMMARY

This application provides an audio signal processing method, apparatus and device, and a storage medium, which may reduce interference leaks in accordance with a determination that an interference moves. The technical solutions are as follows.

According to an aspect of embodiments of this application, an audio signal processing method is provided, performed by an audio signal processing device and including:

acquiring (e.g., obtaining) audio signals collected by different microphones in a microphone array;

filtering, by a first filter, the audio signals to obtain a first target beam, the first filter being configured to suppress an interference speech in the audio signals and enhance a target speech in the audio signals;

filtering, by a second filter, the audio signals to obtain a first interference beam, the second filter being configured to suppress the target speech and enhance the interference speech;

acquiring (e.g., obtaining), by a third filter, a second interference beam of the first interference beam, the third filter being configured to perform weighted adjustment on the first interference beam;

determining a difference between the first target beam and the second interference beam as a first audio processing output; and updating at least one of the second filter and the third filter adaptively, and updating the first filter according to the second filter and the third filter after the updating.

According to another aspect of the embodiments of this application, an audio signal processing method is provided, performed by an audio signal processing device and including:

acquiring audio signals collected by different microphones in a microphone array, the microphone array including n target directions, each of the target directions corresponding to a filter bank, the filter banks being configured to process the audio signals using the above-mentioned method, and n being a positive integer greater than 1;

filtering, for the audio signals corresponding to the n target directions, the audio signals using the corresponding filter banks respectively to obtain n first audio processing outputs corresponding to the n target directions; and filtering an $i^{th}$ first audio processing output according to the n−1 first audio processing outputs except the $i^{th}$ first audio processing output to obtain an $i^{th}$ second audio processing output corresponding to an $i^{th}$ target direction, i being a positive integer greater than 0 and less than n, and repeating the operation to obtain second audio processing outputs corresponding to the n target directions respectively.

According to another aspect of the embodiments of this application, an audio signal processing apparatus is provided, deployed in an audio signal processing device and including:

a first acquisition module, configured to acquire audio signals collected by different microphones in a microphone array;

a first filter module, configured to filter, by a first filter, the audio signals to obtain a first target beam, the first filter being configured to suppress an interference speech in the audio signals and enhance a target speech in the audio signals;

a second filter module, configured to filter, by a second filter, the audio signals to obtain a first interference beam, the second filter being configured to suppress the target speech and enhance the interference speech;

a third filter module, configured to acquire, by a third filter, a second interference beam of the first interference beam, the third filter being configured to perform weighted adjustment on the first interference beam;

a first determining module, configured to determine a difference between the first target beam and the second interference beam as a first audio processing output; and a first updating module, configured to update at least one of the second filter and the third filter adaptively, and update the first filter according to the second filter and the third filter after the updating.

According to another aspect of the embodiments of this application, an audio signal processing apparatus is provided, deployed in an audio signal processing device and including:

a second acquisition module, configured to acquire audio signals collected by different microphones in a microphone array, the microphone array including n target directions, each of the target directions corresponding to a filter bank, and the filter banks being configured to process the audio signals using the first audio processing method described above;

a filter bank module, configured to filter, for the audio signals corresponding to the n target directions, the audio signals using the corresponding filter banks respectively to obtain n first audio processing outputs corresponding to the n target directions; and a fourth filter module, configured to filter an $i^{th}$ first audio processing output according to the n−1 first audio processing outputs except the first audio processing output to obtain an $i^{th}$ second audio processing output corresponding to an target direction, i being a positive integer greater than 0 and less than n, and repeat the operation to obtain second audio processing outputs corresponding to the n target directions respectively.

According to another aspect of the embodiments of this application, a computer device is provided, including a processor and a memory, at least one instruction, at least one segment of program, a code set or an instruction set being stored in the memory, and the at least one instruction, the at least one segment of program, the code set or the instruction set being loaded and executed by the processor to implement the audio signal processing method as described in any of the above-mentioned solutions.

According to another aspect of the embodiments of this application, a computer-readable storage medium is provided, having stored therein at least one instruction, at least one segment of program, code set or instruction set which is loaded and executed by a processor to implement the audio signal processing method as described in any of the above-mentioned solutions.

According to another aspect of the embodiments of this application, a computer program product or computer program is provided, including a computer instruction stored in a computer-readable storage medium. A processor of a computer device reads the computer instruction from the computer-readable storage medium. The processor executes the computer instruction such that the computer device performs the audio signal processing methods provided in the above-mentioned implementations.

The technical solutions provided in this application may include the following beneficial effects:

The first filter is updated according to the second filter and the third filter, so that the first filter, the second filter and the third filter may track steering vector changes of a target sound source in real time and be updated timely. Audio signals collected next time by the microphones are processed by the filters updated in real time, so that the filters output audio processing outputs according to changes of a scenario. Therefore, the tracking performance of the filters is ensured when an interference moves, and interference leaks are reduced.

BRIEF DESCRIPTION OF THE DRAWINGS

The accompanying drawings, which are incorporated herein and constitute a part of this specification, illustrate embodiments consistent with this application and, together with the specification, serve to explain the principles of this application.

DESCRIPTION OF EMBODIMENTS

Figure 1:
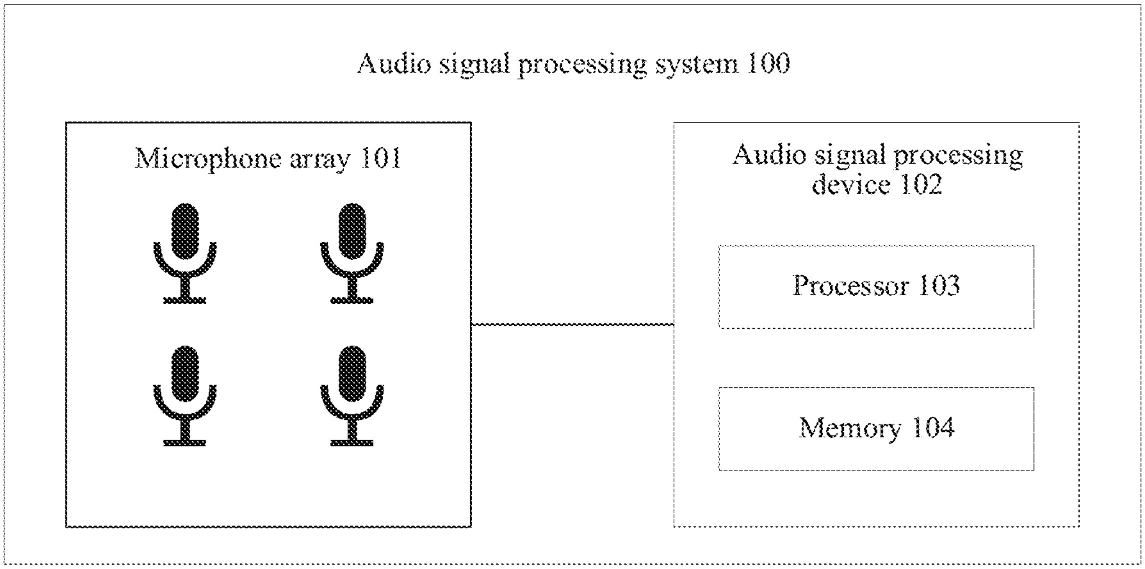
FIG. 1 is a schematic diagram of an audio signal processing system according to an exemplary embodiment.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of apparatuses and methods that are described in detail in the appended claims and that are consistent with some aspects of this application.

It is to be understood that "a plurality of" mentioned herein refers to one or more, and "multiple" refers to two or more than two. And/or describes an association relationship for describing associated objects and represents that three relationships may exist. For example, A and/or B may represent the following three cases: Only A exists, both A and B exist, and only B exists. The character "/" generally indicates an "or" relationship between the associated objects.

With the research and progress of the AI technology, the AI technology is studied and applied to a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied in more fields, and play an increasingly important role.

This application relates to the technical field of smart home, and particularly to an audio signal processing method.

First, some terms included in this application are explained as follows:

(1) Artificial Intelligence (AI)

AI is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

AI technology is a comprehensive discipline, covering a wide range of fields including both a hardware-level technology and a software-level technology. AI technology is a comprehensive discipline, covering a wide range of fields including both a hardware-level technology and a software-level technology. AI software technologies mainly include a computer vision technology, a speech processing technology, a natural language processing (NLP) technology, machine learning (ML)/deep learning, and the like.

2) Speech Technology

Key technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

3) Sound Transmitter

The sound transmitter is commonly known as a voice tube or a microphone, and is a first link in an electro-acoustic device. The sound transmitter is a transducer that converts electrical energy into mechanical energy and then converts the mechanical energy into electrical energy. Currently, people have manufactured various sound transmitters by use of various transduction principles. Capacitive, moving-coil and ribbon sound transmitters, etc., are commonly used for sound recording.

FIG. 1 is a schematic diagram of an audio signal processing system according to an exemplary embodiment. As shown in FIG. 1, the audio signal processing system 100 includes a microphone array 101 and an audio signal processing device 102.

Figure 2:
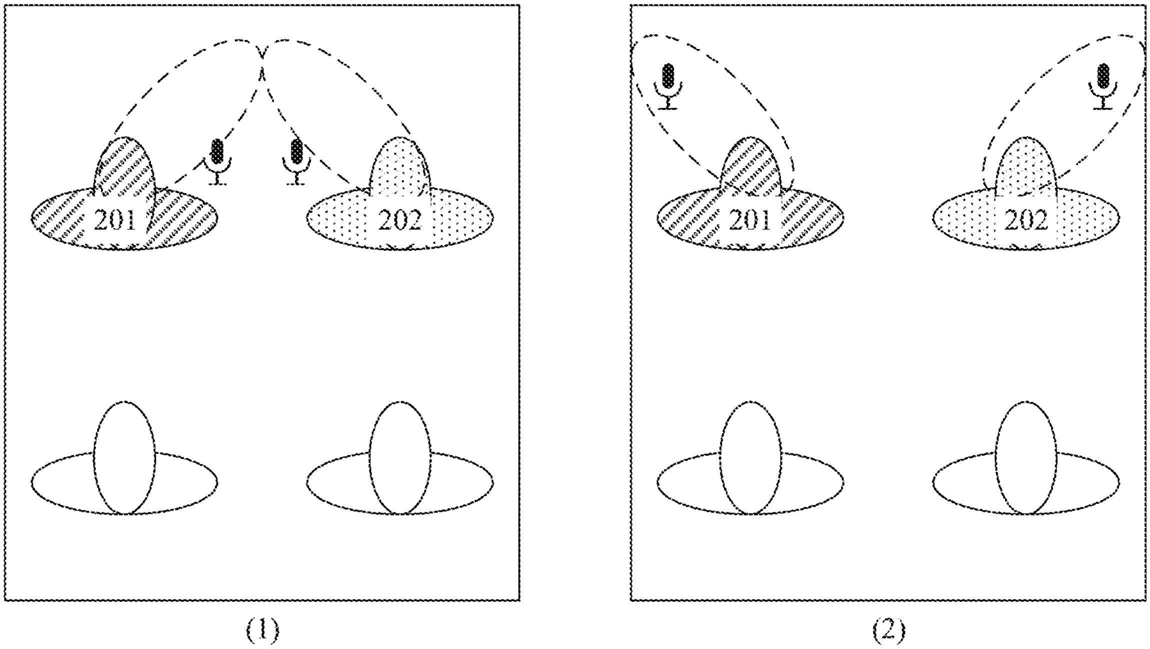
FIG. 2 is a schematic diagram of a distribution of microphones according to another exemplary embodiment of this application.
Figure 3:
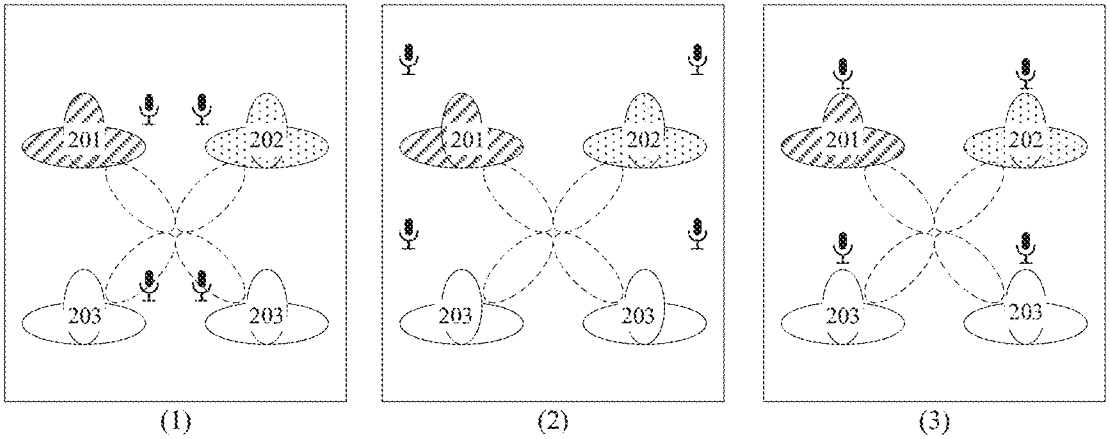
FIG. 3 is a schematic diagram of a distribution of microphones according to another exemplary embodiment of this application.

The microphone array 101 includes at least two microphones arranged in at least two different positions. The microphone array 101 is used to sample and process spatial characteristics of a sound field, thereby calculating an angle and distance of a target speaker according to audio signals received by the microphone array 101 to further track the target speaker and implement subsequent directional speech pickup. For example, the microphone array 101 can be located in a vehicle. When the microphone array includes two microphones, the two microphones are arranged near a driver seat and a co-driver seat respectively. According to a spatial position distribution of the microphones, the microphone array may be compact or distributed. For example, as shown in FIG. 2-1, a compact microphone array is shown, and two microphones are arranged at inner sides of a driver seat 201 and a co-driver seat 202 respectively. In another example, as shown in FIG. 2-2, a distributed microphone array is shown, and two microphones are arranged at outer sides of a driver seat 201 and a co-driver seat 202 respectively. When the microphone array includes four microphones, the four microphones can be arranged near a driver seat, a co-driver seat and two passenger seats respectively, in accordance with some embodiments. For example, as shown in FIG. 3-1, a compact microphone array is shown, and four microphones are arranged at inner sides of a driver seat 201, a co-driver seat 202 and two passenger seats 203 respectively. In another example, as shown in FIG. 3-2, a distributed microphone array is shown, and four microphones are arranged at outer sides of a driver seat 201, a co-driver seat 202 and two passenger seats 203 respectively. In another example, as shown in FIG. 3-3, another distributed microphone array is shown, and four microphones are arranged above a driver seat 201, a co-driver seat 202 and two passenger seats 203 respectively.

The audio signal processing device 102 is connected with the microphone array 101, and is configured to process audio signals collected by the microphone array. In a schematic example, the audio signal processing device includes a processor 103 and a memory 104. At least one instruction, at least one segment of program, a code set or an instruction set is stored in the memory 104. The at least one instruction, the at least one segment of program, the code set or the instruction set is loaded and executed by the processor 103 to implement an audio signal processing method. Exemplarily, the audio signal processing device may be implemented as a part of an in-vehicle speech recognition system. In a schematic example, the audio signal processing device is further configured to, after performing audio signal processing on the audio signals collected by the microphones to obtain audio processing outputs, perform speech recognition on the audio processing outputs to obtain speech recognition results, or correspondingly process the speech recognition results. Exemplarily, the audio signal processing device further includes a main board, an external output/input device, a memory, an external interface, a touch panel system, and a power supply.

A processing element, such as a processor and a controller, is integrated into the main board. The processor may be an audio processing chip.

The external output/input device may include a display component (e.g., a display screen), a sound playback component (e.g., a speaker), a sound collection component (e.g., a microphone), various buttons, etc. The sound collection component may be a microphone array.

The memory stores program code and data.

The external interface may include an earphone interface, a charging interface, a data interface, and the like.

The touch control system may be integrated in the display component or the buttons of the external output/input device, and the touch control system is configured to detect touch operations performed by a user on the display component or the buttons.

The power supply is configured to supply power to other components in the terminal.

In the embodiments of this application, the processor in the main board may execute or call the program code and data stored in the memory to obtain an audio processing output, perform speech recognition on the audio processing output to obtain a speech recognition result, play the generated speech recognition result through the external output/input device, or, respond to a user instruction in the speech recognition result according to the speech recognition result. When an audio content is played, a button, another operation or the like performed when a user intersects with the touch control system may be detected through the touch control system.

In reality, since the position of a sound source is constantly changing, it will affect the sound collection of a microphone. Therefore, in the embodiments of this application, in order to improve the sound collection effect of the speech interaction device, a sound collection component of the speech interaction device may be a microphone array including a certain number of acoustic sensors (e.g., microphones), which are used to sample and process the spatial characteristics of a sound field, so as to calculate an angle and distance of a target speaker, and to achieve tracking of the target speaker(s) and subsequent directional pickup of speech.

This embodiment provides a method for processing collected audio signals to suppress an interference signal in the audio signals and obtain a more accurate target signal. The method will be described below taking the application to the processing of audio signals collected by an in-vehicle microphone array as an example.

Figure 4:
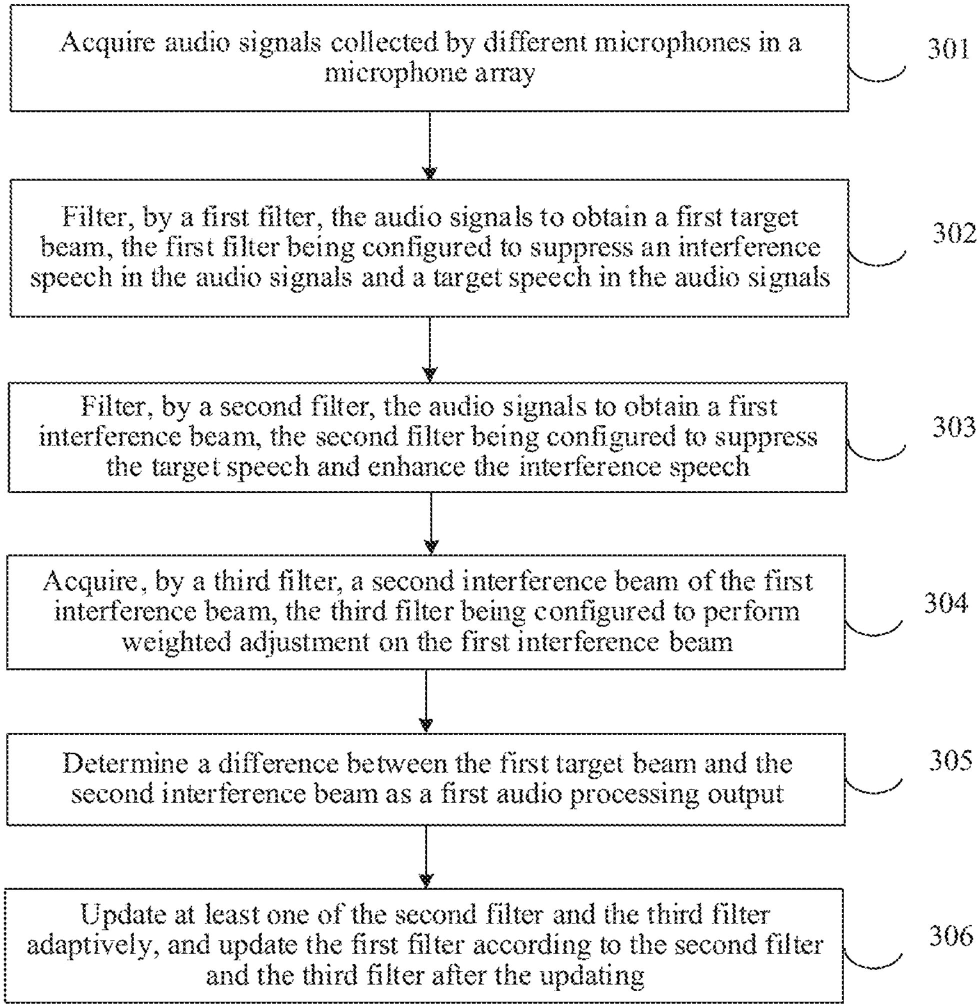
FIG. 4 is a flowchart of an audio signal processing method according to another exemplary embodiment of this application.

Referring to FIG. 4, FIG. 4 is a flowchart of an audio signal processing method according to an exemplary embodiment of this application. The method may be applied to the audio signal processing system shown in FIG. 1, and is performed by an audio signal processing device. As shown in FIG. 4, the method may include the following steps:

Step 301: Acquire audio signals collected by different microphones in a microphone array.

Exemplarily, the audio signals are sound source signals of multiple channels. The number of the channels may correspond to that of microphones in the microphone array. For example, if the number of the microphones in the microphone array is 4, the microphone array collects four audio signals (e.g., four sets of audio signals). Exemplarily, the audio signal includes a target speech produced by an object giving a speech command and an interference speech of an environmental noise.

Exemplarily, the content of the sound source recorded by each audio signal is consistent. For example, for an audio signals at a certain sampling point, if the microphone array includes four microphones, there are four corresponding audio signals, each of which records the content of the sound source signal at the sampling point. However, because the microphones in the microphone array are positioned (e.g., located) at different orientations and/or distances relative to the sound source, the sound source signals received by the microphones may differ in frequency, strength, etc., which makes the audio signals different.

Step 302: Filter, by (e.g., through, using) a first filter, the audio signals to obtain a first target beam, the first filter being configured to suppress an interference speech in the audio signals and enhance a target speech in the audio signals.

Exemplarily, the first filter is configured to filter the audio signals to enhance the target speech in the audio signals and suppress the interference speech in the audio signals. Exemplarily, the first filter corresponds to a first weight matrix, and an initial value of the first weight matrix may be set by a technician based on experiences or arbitrarily. Exemplarily, the first filter is a filter updated in real time, and may be updated with the adaptive updating of a second filter and a third filter. The suppression of the interference speech and the enhancement of the target speech by the first filter are determined according to the enhancement of the interference speech and the suppression of the target speech based on weight matrices corresponding to the second filter and the third filter.

Exemplarily, the target speech is an audio signal received in a target direction, and the interference speech is an audio signal received in another direction except the target direction. Exemplarily, the target speech is a speech signal sent out by an object giving a speech command.

Figure 5:
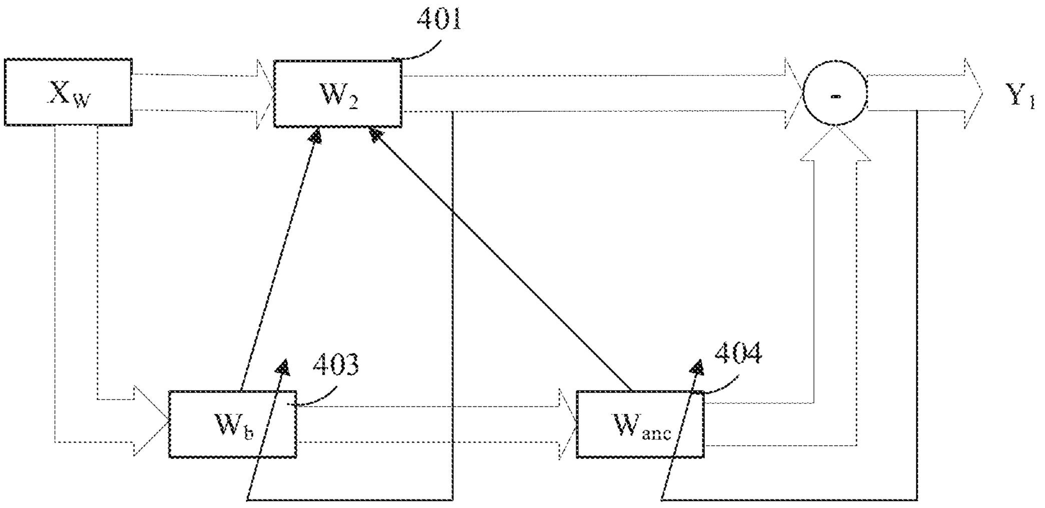
FIG. 5 is a schematic diagram of a composition of a filter according to another exemplary embodiment of this application.

For example, as shown in FIG. 5, the audio signals form an audio signal matrix $X_W$, and the first weight matrix corresponding to the first filter 401 is $W_2$. In such case, the first target beam obtained by filtering the audio signals by the first filter 401 is $X_W W_2$.

Exemplarily, a pre-filter may further be arranged before the first filter. In such case, step 302 further includes steps 3021 to 3022:

Step 3021: Perform, by the pre-filter, first filtering on the audio signals to obtain a target pre-beam, the pre-filter is a filter calculated with training data and the pre-filter is used to suppress the interference speech and enhance the target speech.

Step 3022: Perform, by the first filter, second filtering on the target pre-beam to obtain the first target beam.

Exemplarily, the pre-filter is a filter calculated with training data. The pre-filter is also configured to enhance the target speech in the audio signals and suppress the interference speech. Exemplarily, the pre-filter is a filter calculated according to a linearly constrained minimum-variance (LCMV) criterion. The pre-filter is a fixed value after being calculated, and may not be updated iteratively.

Figure 6:
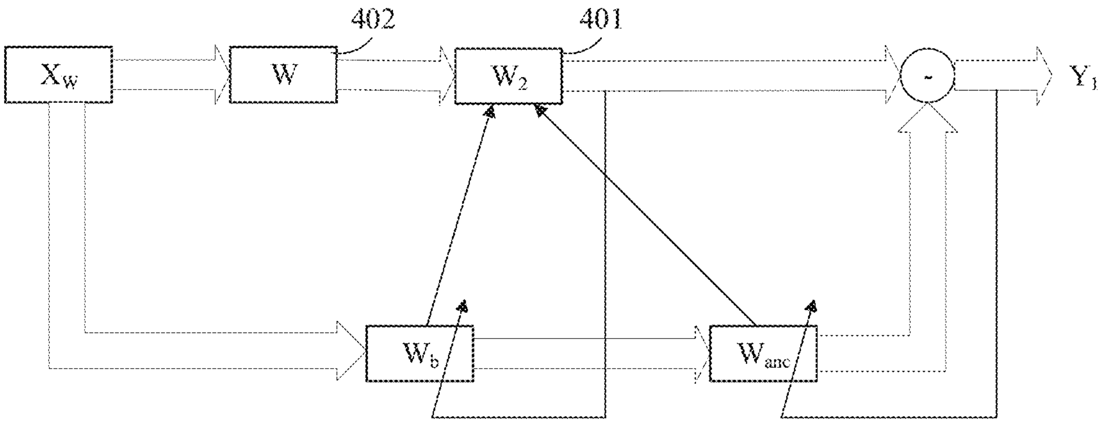
FIG. 6 is a schematic diagram of a composition of a filter according to another exemplary embodiment of this application.

For example, as shown in FIG. 6, the audio signals form an audio signal matrix $X_W$, a pre-weight matrix corresponding to the pre-filter 402 is W, and the first weight matrix corresponding to the first filter 401 is $W_2$. In such case, the target pre-beam obtained by processing the audio signals by the pre-filter 402 is $X_W W$, and the first target beam obtained by filtering the target pre-beam by the first filter 401 is $X_W W W_2$.

Exemplarily, a method for calculating the pre-filter is provided. The training data collected by the microphone array in an application environment is acquired, the application environment being a spatial range where the microphone array is placed and used, and the training data including sample audio signals collected by different microphones in the microphone array. The pre-filter is calculated with the training data according to an LCMV criterion.

According to the audio signal processing method provided in this application, the pre-calculated pre-filter is set before the first filter, and the pre-filter processes the audio signals at first, so that the accuracy of separating the target speech is improved, and a processing capability of the filter in an initial stage for the audio signals is improved.

Exemplarily, the pre-filter is calculated according to practical data collected in a practical audio signal collection scenario. According to the audio signal processing method provided in this application, the pre-filter is obtained by training with practical audio signal collected in the application environment, so that the pre-filter may be close to the practical application scenario, a matching degree of the pre-filter and the application scenario is improved, and an interference suppression effect of the pre-filter is improved.

Exemplarily, training data corresponds to a target direction. A pre-filter corresponding to a certain target direction is obtained by training with training data in the target direction, so that the pre-filter obtained by training may enhance a target speech in the target direction and suppress an interference speech in another direction.

According to the audio signal processing method provided in this application, the pre-filter is obtained by training with the training data collected in the target direction, so that the pre-filter may recognize an audio signal in the target direction better, and a capability of the pre-filter in suppressing the audio signal in another direction is improved. Exemplarily, taking the microphone array including four microphones as an example, time-domain signals collected by the microphones are mica, mica, mica and mica respectively, and the signals collected by the microphones are converted to a frequency domain to obtain frequency-domain signals $X_{W1}$, $X_{W2}$, $X_{W3}$ and $X_{W4}$. Any microphone is taken as a reference microphone, and a relative transmission function $StrV_j$ of the other microphones may be obtained, j being an integer. If the number of the microphones is k, 0<j≤k−1. Taking the reference microphone being the first microphone as an example, the relative transmission function $StrV_j$ of the other microphones is:

$$StrV_j = X_{Wj}/X_{W1}.$$

Then, an optical filter (pre-filter) in a current real application environment is obtained according to the LCMV criterion. A formula for the LCMV criterion is:

$$\text{minimize } J(W) = 1/2\left(W^H R_{xx} W\right)$$

$$\text{subject to } C^H W = f$$

$$C = \begin{bmatrix} 1 \\ StrV_1 \\ StrV_2 \\ StrV_3 \end{bmatrix},$$

where W represents a weight matrix corresponding to the pre-filter; $R_{xx}=E[XX^H]$, $X=[X_{W1}, X_{W2}, X_{W3}, X_{W4}]^T$; C represents a steering vector; and $f=[1, \xi_1, \xi_2, \xi_3]$ represents a constraint, $\xi$ being 1 in an expected direction, and $\xi$ being set to $\xi_n$ ($\xi_n=0$ or $\xi_n<<1$) in another zero interference direction. A zero interference may be set as required as long as the interference suppression capability is ensured. Step 303: Filter, by a second filter, the audio signals to obtain a first interference beam, the second filter being configured to suppress the target speech and enhance the interference speech.

The second filter is configured to suppress the target speech in the audio signals and enhance the interference speech, so as to obtain a beam of the interference speech as clearly as possible. Exemplarily, the second filter corresponds to a second weight matrix, and an initial value of the second weight matrix may be set by a technician based on experience.

For example, as shown in FIG. 5, at least two audio signals form an audio signal matrix $X_W$, and the second weight matrix corresponding to the second filter 403 is $W_b$. In such case, a first interference beam obtained by filtering the at least two audio signals by the second filter 403 is $X_W W_b$.

Step 304: Acquire, by a third filter, a second interference beam of the first interference beam, the third filter being configured to perform weighted adjustment on the first interference beam.

The third filter is configured to perform second filtering on an output of the second filter. Exemplarily, the third filter is configured to adjust weights of the target speech and interference speech in the first interference beam to subtract the interference beam from the target beam in step 305, thereby removing the interference beam in the target beam to obtain an accurate audio output result.

For example, as shown in FIG. 5, the audio signals form an audio signal matrix $X_W$, the second weight matrix corresponding to the second filter 403 is $W_b$, and a third weight matrix corresponding to the third filter 404 is $W_{anc}$. In such case, a first interference beam obtained by filtering at least two audio signals by the second filter 403 is $X_W W_b$, and a second interference beam obtained by filtering the first interference beam by the third filter 404 is $X_W W_b W_{anc}$.

Step 305: Determine a difference between the first target beam and the second interference beam as a first audio processing output.

An audio processing output is a beam of a target speech obtained by filtering.

For example, as shown in FIG. 5, the audio signals form an audio signal matrix $X_W$, and the second interference beam $X_W W_b W_{anc}$ output by the third filter is subtracted from the first target beam $X_W W_2$ output by the first filter to obtain the first audio processing output $Y_1=X_W W_2-X_W W_b W_{anc}$.

In another example, as shown in FIG. 6, at least two audio signals form an audio signal matrix $X_W$, and the second interference beam $X_W W_b W_{anc}$ output by the third filter is subtracted from the first target beam $X_W W W_2$ output by the first filter to obtain the first audio processing output $Y_1=X_W W W_2-X_W W_b W_{anc}$.

Exemplarily, a filter combination shown in FIG. 6 uses a pre-filter for preliminary filtering with relatively high filtering accuracy in an initial stage, so that such a filtering mode may be used for a distributed or compact microphone array. Exemplarily, a filter combination shown in FIG. 5 does not use any pre-filter, and no pre-filter needs to be obtained in advance using training data collected in a practical running environment, so that the dependence of the filter combination on the practical running environment is reduced.

Step 306, Update at least one of the second filter and the third filter adaptively, and update the first filter according to the second filter and the third filter after the updating.

Exemplarily, the second filter and the third filter are adjusted according to the beams obtained by filtering. Exemplarily, the second filter is filtered according to the first target beam, and the third filter is updated according to the first audio processing output. Alternatively, the second filter and the third filter are updated according to the first audio processing output. Alternatively, the second filter is updated according to the first target beam. Alternatively, the second filter is updated according to the first audio processing output. Alternatively, the third filter is updated according to the first audio processing output.

According to the audio signal processing method provided in this application, the second filter is updated according to the first target beam or the first audio processing output, and the third filter is updated according to the first audio processing output. Therefore, the second filter may obtain a more accurate interference beam and suppress the target beam more accurately, and the third filter may weight the first interference beam more accurately to further improve the accuracy of the audio processing output.

Exemplarily, the second filter or the third filter is updated adaptively by least mean square (LMS) or normalized least mean square (NLMS).

Exemplarily, a process of updating a filter adaptively by an LMS algorithm includes the following steps:

1): Given w(0).

2): Calculate an output value: $y(k)=w(k)^T x(k)$.

3): Calculate an estimation error: e(k)=d(k)—y(k).

4): Update weight: $w(k+1)=w(k)+\mu e(k)x(k)$.

Herein, w(0) represents an initial weight matrix of the filter, μ represents an update step length, y(k) represents an estimated noise, w(k) represents a weight matrix before the updating of the filter, w(k+1) represents a weight matrix after the updating of the filter, x(k) represents an input value, e(k) represents a de-noised speech, d(k) represents a noisy speech, and k represents an iteration count.

For example, the audio signal matrix formed by the audio signals is $X_W$, the first weight matrix corresponding to the first filter is $W_2$, the second weight matrix corresponding to the second filter is $W_b$, and the third weight matrix corresponding to the third filter is $W_{anc}$. In such case, an updated weight matrix obtained by updating the third filter adaptively by the LMS algorithm according to the first audio processing output $Y_1=X_W W_2-X_W W_b W_{anc}$ is $(W_b+\mu Y_1 X_W)$.

Exemplarily, after the second filter and the third filter are updated, the first filter is updated according to the updated second filter and the third filter. Exemplarily, the first filter is calculated according to a relative relation among the first filter, the second filter and the third filter.

Exemplarily, if the first filter corresponds to a first weight matrix, the second filter corresponds to a second weight matrix, and the third filter corresponds to a third weight matrix, in an implementation of updating the first filter according to the second filter and the third filter after the updating, the first weight matrix may be calculated, after the updating, according to the second weight matrix and the third weight matrix, and then the first filter is updated according to the first weight matrix. Exemplarily, a filter processes an input audio signal by use of a weight matrix. The filter multiplies the input audio signal by the weight matrix corresponding to the filter to obtain an audio signal output by filtering.

Exemplarily, in some cases, a method for calculating, after the updating, the first weight matrix according to the second weight matrix and the third weight matrix may be determining, after the updating, a product of the second weight matrix and the third weight matrix as a target matrix and then determining a difference between an identity matrix and the target matrix as the first weight matrix.

For example, the first weight matrix is $W_2$, the second weight matrix is $W_b$, and the third weight matrix is $W_{anc}$. In such case, $W_2=(1-W_b W_{anc})$.

For example, as shown in FIG. 5, the second filter 403 is updated adaptively according to the first target beam output by the first filter 401, and the third filter 404 is updated adaptively according to the first audio processing output. Then, the first filter 401 is updated according to the updated second filter 403 and third filter 404.

In summary in the audio signal processing method provided in the present application, by updating the first filter according to the second filter and the third filter, the first, second, and third filters can be tracked in in real time. The steering vector of the target sound source changes, the filter is updated in time, and the real-time update filter is used to process the audio signal collected by the microphone next time, so that the filter can output the audio processing output according to the change of the scene, so as to ensure the sound quality when there is interference and movement. The tracking performance of the filters reduces the problem of interference leakage.

According to the audio signal processing method provided in this application, the first filter, the second filter and the third filter are updated in real time according to data obtained by each processing, so that the filters may change according to the steering vector changes of the target sound source, and may be applied to a scenario where interference noises keep changing. Therefore, the tracking performance of the filters is ensured when an interference moves, and interference leaks are reduced.

Figure 7:
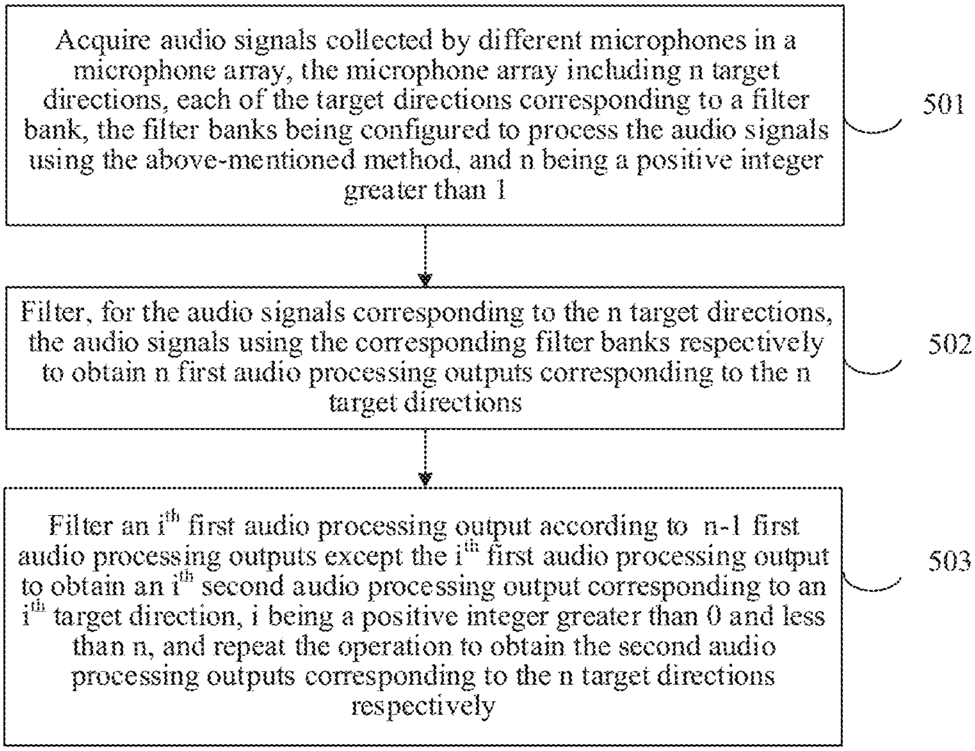
FIG. 7 is a flowchart of an audio signal processing method according to another exemplary embodiment of this application.

Referring to FIG. 7, FIG. 7 is a flowchart of an audio signal processing method according to an exemplary embodiment of this application. The method may be applied to the audio signal processing system shown in FIG. 1, and is performed by an audio signal processing device. As shown in FIG. 7, the method may include the following steps:

Step 501: Acquire audio signals collected by different microphones in a microphone array, the microphone array including n target directions, each of the target directions corresponding to a filter bank, the filter banks being configured to process the audio signals using the above-mentioned method, and n being a positive integer greater than 1.

Exemplarily, multiple target directions may be set for the microphone array, and the target directions are in any quantity. Exemplarily, a filter bank is obtained by training according to each target direction, and the filters process the audio signals by the method shown in FIG. 4. Exemplarily, the filter bank may be any one of the filter banks shown in FIGS. 5 and 6. Exemplarily, different target directions correspond to different filter banks. Exemplarily, a filter bank corresponding to a target direction is obtained by training using an audio signal in the target direction as a target speech.

Figure 8:
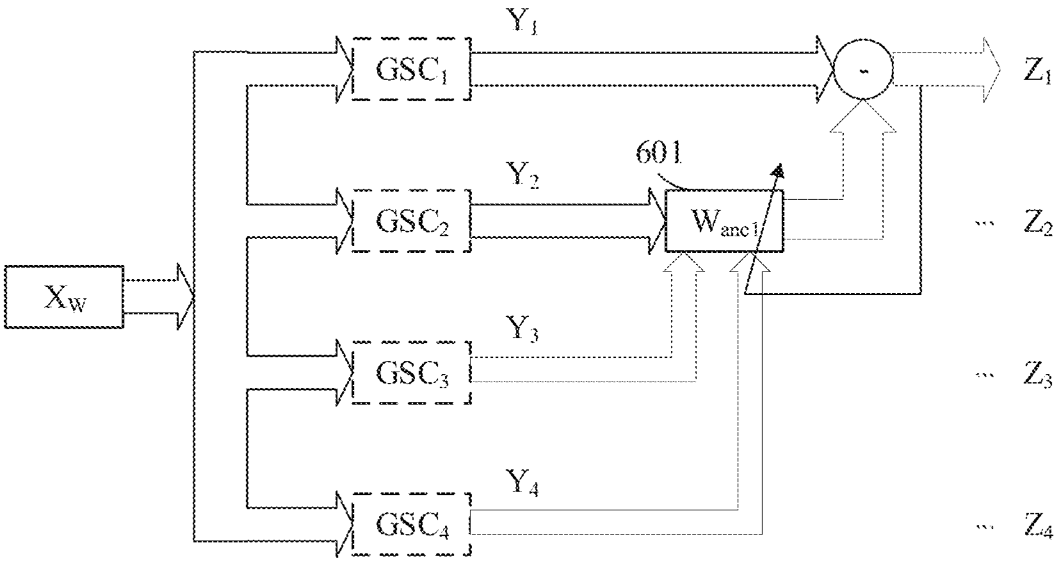
FIG. 8 is a schematic diagram of a composition of a filter according to another exemplary embodiment of this application.

For example, as shown in FIG. 8, four target directions are set for the microphone array. The four target directions correspond to four filter banks: $GSC_1$, $GSC_2$, $GSC_3$, and $GSC_4$. Each target direction corresponds to a filter bank.

Exemplarily, the filter bank includes a first filter, a second filter, and a third filter, or, a pre-filter, a first filter, a second filter, and a third filter. When an $i^{th}$ filter bank includes a pre-filter, the pre-filter is obtained by training with training data collected by the microphone array in an $i^{th}$ target direction.

Step 502: Filter, for the audio signals corresponding to the n target directions, the audio signals using the corresponding filter banks respectively to obtain n first audio processing outputs corresponding to the n target directions.

For example, as shown in FIG. 8, taking four target directions as an example, an audio signal matrix $X_W$ formed by the audio signals is input to four filter banks respectively to obtain first audio processing outputs $Y_1$, $Y_2$, $Y_3$ and $Y_4$ corresponding to the four target directions respectively. Exemplarily, after each filter bank obtains a filtering result, a first filter, second filter and third filter in the filter bank may be updated in real time according to the filtering result.

Step 503: Filter an $i^{th}$ first audio processing output according to the n−1 first audio processing outputs except the $i^{th}$ first audio processing output to obtain an $i^{th}$ second audio processing output corresponding to an $i^{th}$ target direction, i being a positive integer greater than 0 and less than n, and repeat the operation to obtain second audio processing outputs corresponding to the n target directions respectively.

Exemplarily, for the $i^{th}$ target direction, the $i^{th}$ first audio processing output is a target speech, and the first audio processing outputs in the other target directions are interference speeches. Exemplarily, when an audio signal in the $i^{th}$ target direction is a target speech, audio signals in the other target direction are interference signals, the $i^{th}$ first audio processing output corresponding to the $i^{th}$ target direction is determined as a target beam, and the n−1 first audio processing outputs corresponding to the other target directions are determined as interference beams. The n−1 first audio processing outputs are filtered by an $i^{th}$ fourth filter to obtain a third interference beam, and the $i^{th}$ first audio processing output is filtered according to the third interference beam. Therefore, the accuracy of an audio processing result output in the $i^{th}$ target direction is improved.

Exemplarily, the n−1 first audio processing outputs except the $i^{th}$ first audio processing output are determined as an $i^{th}$ interference group, i being a positive integer greater than 0 and less than n. The interference group is filtered by an $i^{th}$ fourth filter corresponding to the $i^{th}$ target direction to obtain an $i^{th}$ third interference beam, the fourth filter being configured to perform weighted adjustment on the interference group. A difference between the $i^{th}$ first audio processing output and the $i^{th}$ third interference beam is determined as the $i^{th}$ second audio processing output. The $i^{th}$ fourth filter is updated adaptively according to the $i^{th}$ second audio processing output.

Exemplarily, the $i^{th}$ fourth filter corresponds to the $i^{th}$ target direction.

For example, as shown in FIG. 8, taking four target directions as an example, the $1^{st}$ target direction is determined as a direction corresponding to a target speech. In such case, first audio processing outputs $Y_2$, $Y_3$ and $Y_4$ corresponding to the $2^{nd}$ target direction, the $3^{rd}$ target direction and the $4^{th}$ target direction are input to a $1^{st}$ fourth filter 601 as a $1^{st}$ interference group to obtain a Pt third interference beam. The $1^{st}$ third interference beam is subtracted from a $1^{st}$ first audio processing output $Y_1$ to obtain a $1^{st}$ second audio processing output $Z_1$. The $1^{st}$ fourth filter 601 is updated adaptively according to the $1^{st}$ second audio processing output $Z_1$.

Figure 9:
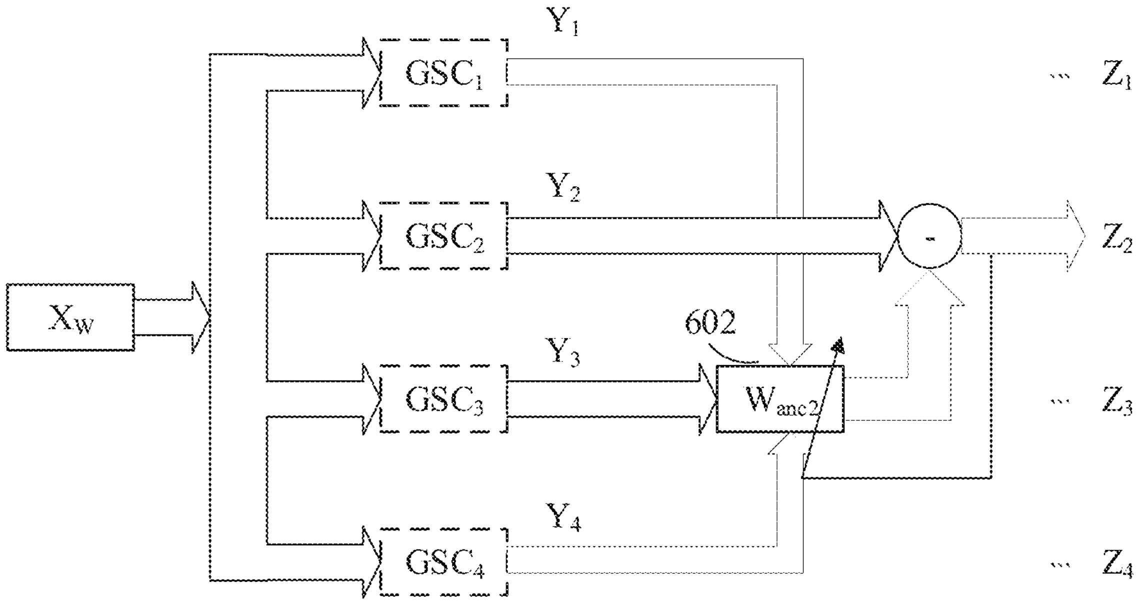
FIG. 9 is a schematic diagram of a composition of a filter according to another exemplary embodiment of this application.

For example, as shown in FIG. 9, taking four target directions as an example, the $2^{nd}$ target direction is determined as a direction corresponding to a target speech. In such case, first audio processing outputs $Y_1$, $Y_3$ and $Y_4$ corresponding to the $1^{st}$ target direction, the $3^{rd}$ target direction and the $4^{th}$ target direction are input to a $2^{nd}$ fourth filter 602 as a $2^{nd}$ interference group to obtain a $2^{nd}$ third interference beam. The $2^{nd}$ third interference beam is subtracted from a $2^{nd}$ first audio processing output $Y_2$ to obtain a $2^{nd}$ second audio processing output $Z_2$. The $2^{nd}$ fourth filter 602 is updated adaptively according to the $2^{nd}$ second audio processing output $Z_2$.

Figure 10:
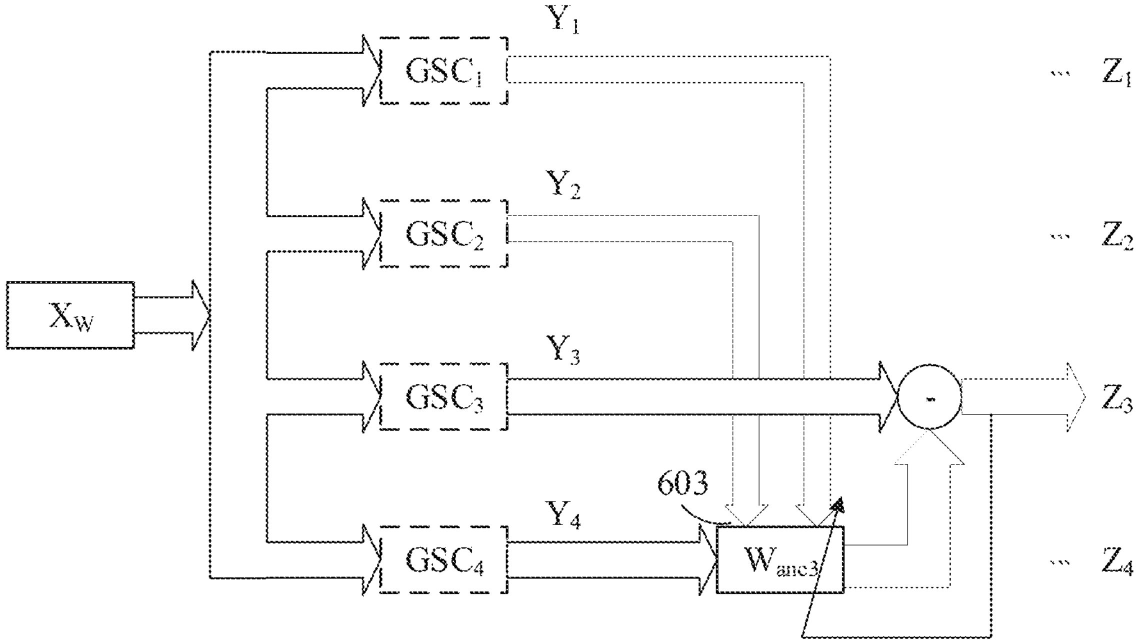
FIG. 10 is a schematic diagram of a composition of a filter according to another exemplary embodiment of this application.

For example, as shown in FIG. 10, taking four target directions as an example, the $3^{rd}$ target direction is determined as a direction corresponding to a target speech. In such case, first audio processing outputs $Y_1$, $Y_2$ and $Y_4$ corresponding to the $1^{st}$ target direction, the $2^{nd}$ target direction and the $4^{th}$ target direction are input to a $3^{rd}$ fourth filter 603 as a $3^{rd}$ interference group to obtain a $3^{rd}$ third interference beam. The $3^{rd}$ third interference beam is subtracted from a $3^{rd}$ first audio processing output $Y_3$ to obtain a $3^{rd}$ second audio processing output $Z_3$. The $3^{rd}$ fourth filter 603 is updated adaptively according to the $3^{rd}$ second audio processing output $Z_3$.

Figure 11:
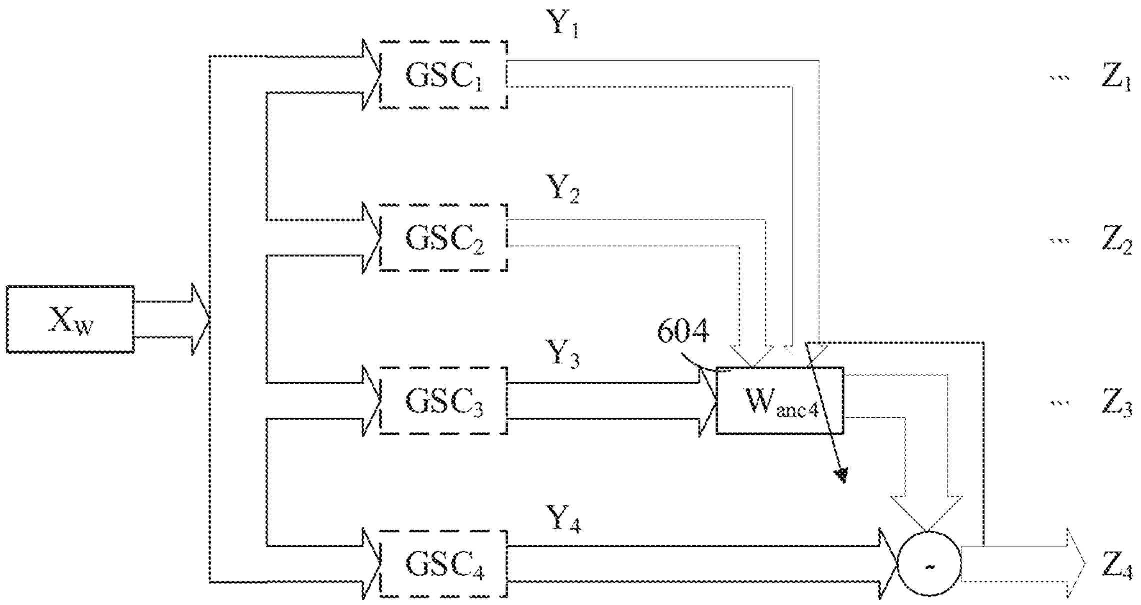
FIG. 11 is a schematic diagram of a composition of a filter according to another exemplary embodiment of this application.

For example, as shown in FIG. 11, taking four target directions as an example, the $4^{th}$ target direction is determined as a direction corresponding to a target speech. In such case, first audio processing outputs $Y_1$, $Y_2$ and $Y_3$ corresponding to the $1^{st}$ target direction, the $2^{nd}$ target direction and the $3^{rd}$ target direction are input to a $4^{th}$ fourth filter 604 as a $4^{th}$ interference group to obtain a $4^{th}$ third interference beam. The $4^{th}$ third interference beam is subtracted from a $4^{th}$ first audio processing output $Y_4$ to obtain a $4^{th}$ second audio processing output $Z_4$. The $4^{th}$ fourth filter 604 is updated adaptively according to the $4^{th}$ second audio processing output $Z_4$.

In summary, according to the audio signal processing method provided in this application, audio processing is performed on the collected audio signals in multiple target directions to obtain multiple audio processing outputs corresponding to the multiple target directions respectively, and interferences in the audio processing output corresponding to a current direction are eliminated by the audio processing outputs corresponding to the other directions, so that the accuracy of the audio processing output corresponding to the current direction is improved.

Exemplarily, an exemplary embodiment of applying the above-mentioned audio signal processing method to an in-vehicle speech recognition scenario is presented.

In the in-vehicle speech recognition scenario, microphones are arranged at a driver seat, co-driver seat and two passenger seats of a vehicle respectively to form a microphone array, configured to collect a speech interaction instruction given by a driver or a passenger. After the microphone array collects audio signals, the audio signals are filtered by the method shown in FIG. 4 or 7 to obtain a first audio processing output or a second audio processing output. Speech recognition or semantic recognition is performed on the first audio processing output or the second audio processing output by use of a speech recognition algorithm, thereby recognizing the speech interaction instruction given by the driver or the passenger. Therefore, an in-vehicle computer system responds according to the speech interaction instruction.

Exemplarily, four target directions are determined according to a position distribution of the driver seat, the co-driver seat and the two passenger seats in the vehicle. The four target directions are used for receiving a speech interaction instruction of the driver in the driver seat and speech interaction instructions of passengers seated in the co-driver seat and the passenger seats respectively. After the microphone array collects audio signals, the audio signals are filtered by the method shown in FIG. 4 or 7. Filtering is performed taking speeches in different target directions as target speeches to obtain audio processing outputs corresponding to the four target directions respectively. The audio processing output enhances the audio signal in the selected target direction and suppresses interferences in the other target directions. Therefore, the accuracy of the audio processing output is improved, and it is convenient to recognize a speech instruction in the signal through a speech recognition algorithm.

Figure 12:
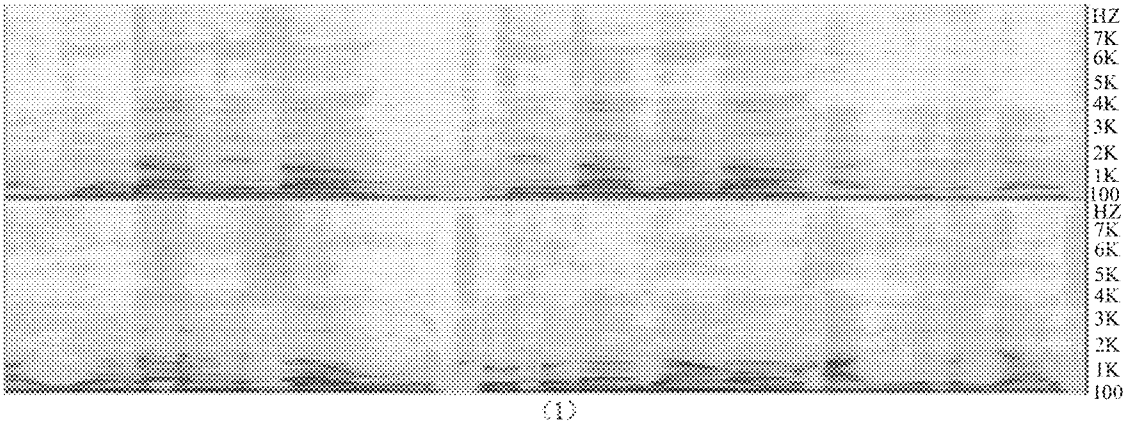
FIG. 12 shows a two-channel speech spectrogram according to another exemplary embodiment of this application.
Figure 12:
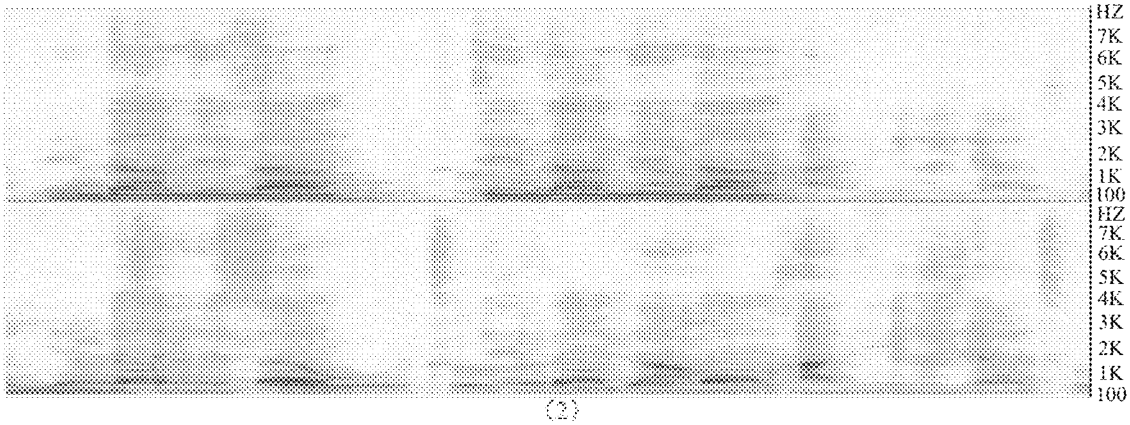
Figure 12:
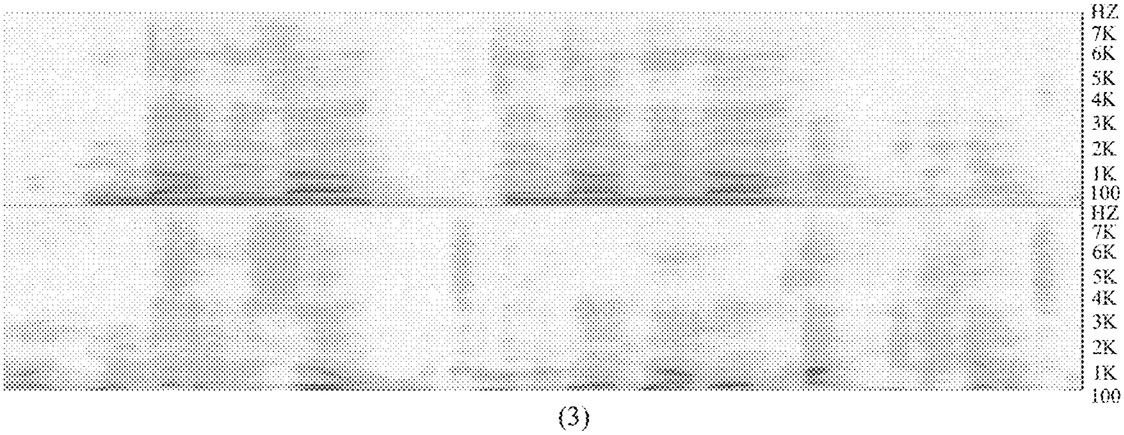
Figure 13:
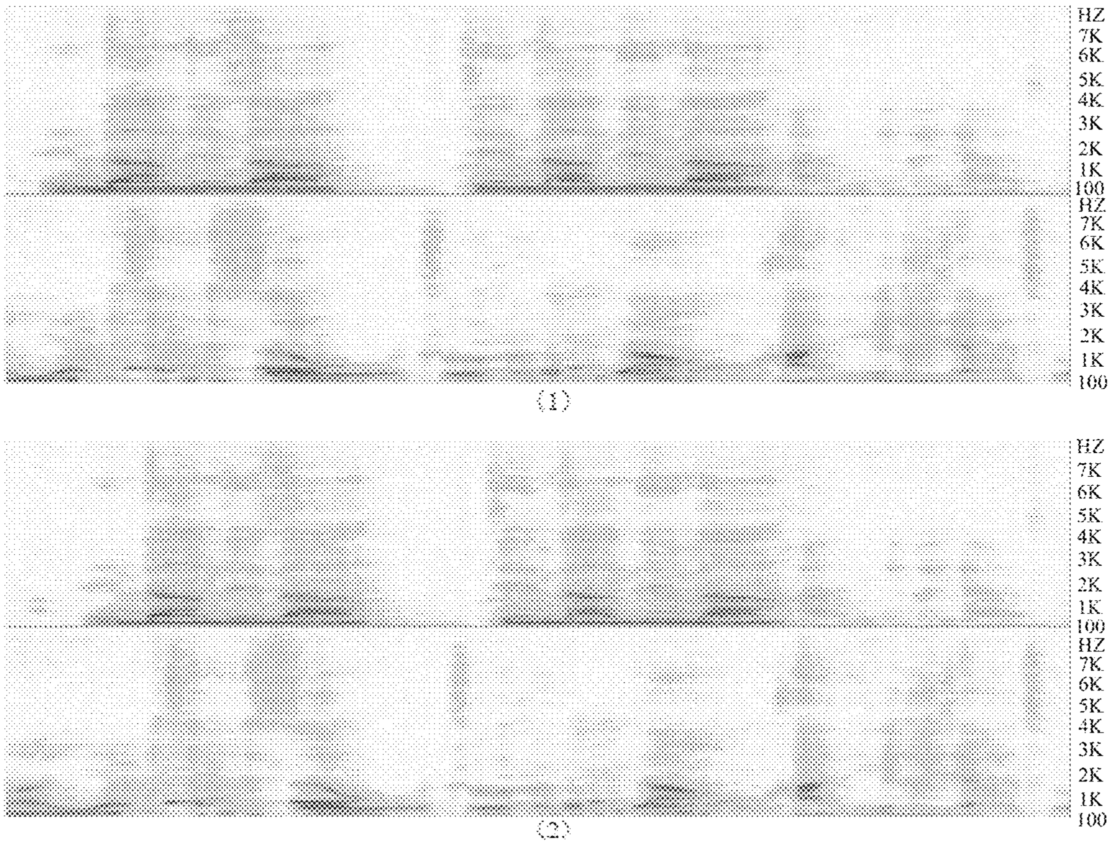
FIG. 13 shows a two-channel speech spectrogram according to another exemplary embodiment of this application.

Exemplarily, FIG. 12-1 shows a two-channel speech spectrum collected by microphones arranged at the driver seat and the co-driver seat respectively, where the upper is a speech spectrum corresponding to the driver seat, and the lower is a speech spectrum corresponding to the co-driver seat. FIG. 12-2 shows a two-channel speech spectrum obtained by filtering collected audio signals by a pre-filter according to this application. Comparison between 12-1 and 12-2 shows clearly that processing by the pre-filter obtained by training with data implements spatial filtering of a speech, and reduces interferences of both channels to large extents. FIG. 12-3 shows a two-channel speech spectrogram obtained by processing audio signals by combining a data pre-filter and a conventional GSC. 12-3 is better than 12-2 in interference leak. FIG. 13-1 shows a two-channel speech spectrogram obtained by processing audio signals by the audio signal processing method shown in FIG. 7 (a totally blind GSC structure). Compared with 12-3, FIG. 13-1 further reduces speech leaks. This is because a left channel in a separated sound source in an experiment is a moving sound source, a conventional GSC structure shown in FIG. 12-3 cannot track changes of a moving sound source well, but the GSC structure in FIG. 13-1 may track changes of a moving sound source well although no data-related pre-filter is used, and thus has a higher capability in suppressing an interference speech. FIG. 13-2 shows a two-channel speech spectrogram obtained by processing audio signals by the audio signal processing method shown in FIG. 4. The audio signals are filtered by combining a pre-filter and a totally blind GSC structure, and meanwhile, the data-related pre-filter is combined with a capability in tracking a moving interference sound source, so that the best effect is achieved.

Figure 14:
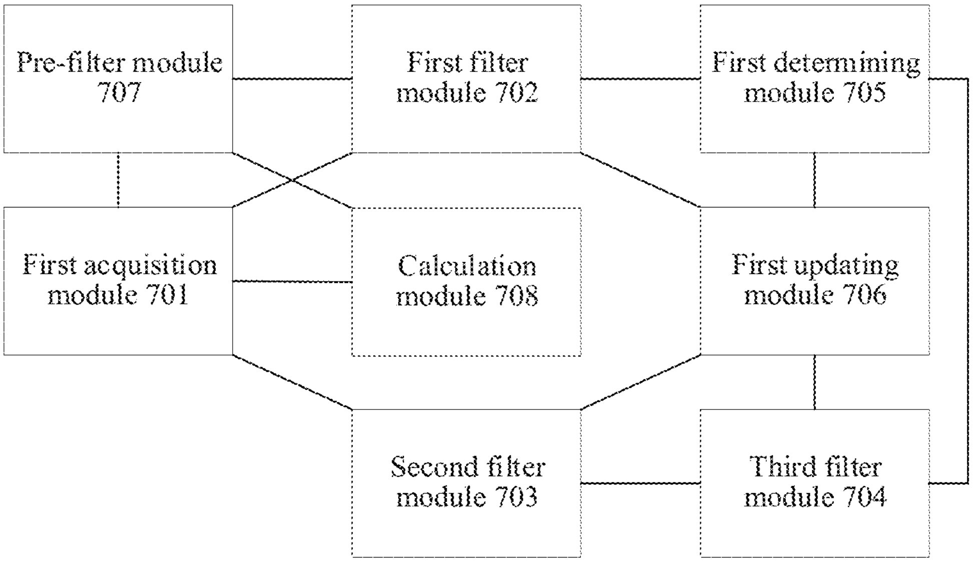
FIG. 14 is a block diagram of an audio signal processing apparatus according to another exemplary embodiment of this application.

Referring to FIG. 14, FIG. 14 is a block diagram of an audio signal processing apparatus according to an exemplary embodiment of this application. The apparatus is configured to perform all or part of the steps in the method of the embodiment shown in FIG. 4. As shown in FIG. 14, the apparatus may include:

- a first acquisition module 701, configured to acquire audio signals collected by different microphones in a microphone array;
- a first filter module 702, configured to filter, by a first filter, the audio signals to obtain a first target beam, the first filter being configured to suppress an interference speech in the audio signals and enhance a target speech in the audio signals;
- a second filter module 703, configured to filter, by a second filter, the audio signals to obtain a first interference beam, the second filter being configured to suppress the target speech and enhance the interference speech;
- a third filter module 704, configured to acquire, by a third filter, a second interference beam of the first interference beam, the third filter being configured to perform weighted adjustment on the first interference beam;
- a first determining module 705, configured to determine a difference between the first target beam and the second interference beam as a first audio processing output; and
- a first updating module 706, configured to update at least one of the second filter and the third filter adaptively, and update the first filter according to the second filter and the third filter after the updating.

In a possible implementation, the first filter corresponds to a first weight matrix, the second filter corresponds to a second weight matrix, and the third filter corresponds to a third weight matrix.

The first updating module 706 is further configured to calculate, after the updating, the first weight matrix according to the second weight matrix and the third weight matrix.

The first updating module 706 is further configured to update the first filter according to the first weight matrix.

In a possible implementation, the first updating module 706 is further configured to determine, after the updating, a product of the second weight matrix and the third weight matrix as a target matrix; and determine a difference between an identity matrix and the target matrix as the first weight matrix.

In a possible implementation, the first updating module 706 is further configured to:

update the second filter according to the first target beam, and update the third filter according to the first audio processing output; or, update the second filter and the third filter according to the first audio processing output; or, update the second filter according to the first target beam; or, update the second filter according to the first audio processing output; or, update the third filter according to the first audio processing output.

In a possible implementation, the apparatus further includes:

a pre-filter module 707, configured to perform, by a pre-filter, first filtering on the audio signals to obtain a target pre-beam, the pre-filter being a filter calculated with training data and being configured to suppress the interference speech and enhance the target speech.

The first filter module 702 is further configured to perform, by the first filter, second filtering on the target pre-beam to obtain the first target beam.

In a possible implementation, the apparatus further includes:

the first acquisition module 701, further configured to acquire the training data collected by the microphone array in an application environment, the application environment being a spatial range where the microphone array is placed and used, and the training data including sample audio signals collected by different microphones in the microphone array; and a calculation module 708, configured to calculate the pre-filter with the training data according to an LCMV criterion.

Figure 15:
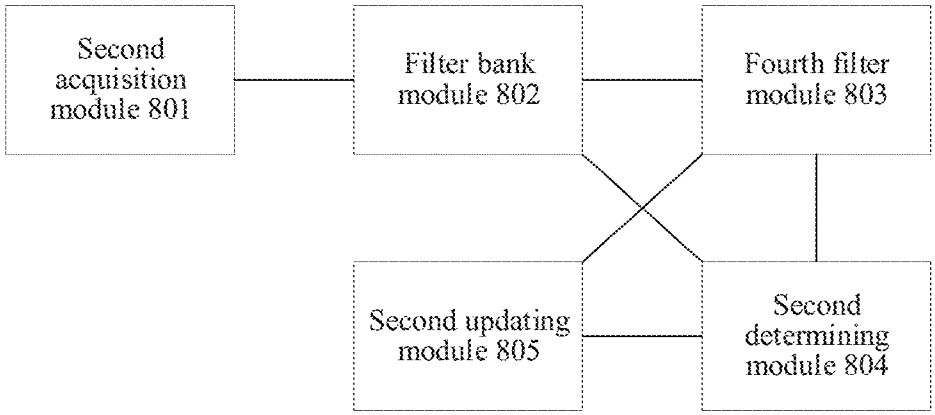
FIG. 15 is a block diagram of an audio signal processing apparatus according to another exemplary embodiment of this application.

Referring to FIG. 15, FIG. 15 is a block diagram of an audio signal processing apparatus according to an exemplary embodiment of this application. The apparatus is configured to perform all or part of the steps in the method of the embodiment shown in FIG. 7. As shown in FIG. 15, the apparatus may include:

a second acquisition module 801, configured to acquire audio signals collected by different microphones in a microphone array, the microphone array including n target directions, each of the target directions corresponding to a filter bank, the filter banks being configured to process the audio signals using any method as described in the embodiment shown in FIG. 4, and n being a positive integer greater than 1;

a filter bank module 802, configured to filter, for the audio signals corresponding to the n target directions, the audio signals using the corresponding filter banks respectively to obtain n first audio processing outputs corresponding to the n target directions; and a fourth filter module 803, configured to filter an $i^{th}$ first audio processing output according to the n−1 first audio processing outputs except the $i^{th}$ first audio processing output to obtain an $i^{th}$ second audio processing output corresponding to an $i^{th}$ target direction, i being a positive integer greater than 0 and less than n, and repeat the operation to obtain second audio processing outputs corresponding to the n target directions respectively.

In a possible implementation, the apparatus further includes:

the fourth filter module 803, further configured to determine the n−1 first audio processing outputs except the $i^{th}$ first audio processing output as an $i^{th}$ interference group;

the fourth filter module 803, further configured to filter, by an $i^{th}$ fourth filter corresponding to the $i^{th}$ target direction, the $i^{th}$ interference group to obtain an $i^{th}$ third interference beam, the fourth filter being configured to perform weighted adjustment on the interference group;

a second determining module 804, configured to determine a difference between the $i^{th}$ first audio processing output and the $i^{th}$ third interference beam as the $i^{th}$ second audio processing output; and a second updating module 805, configured to update the $i^{th}$ fourth filter adaptively according to the $i^{th}$ second audio processing output.

In a possible implementation, an $i^{th}$ filter bank includes a pre-filter, obtained by training with training data collected by the microphone array in the $i^{th}$ target direction.

Figure 16:
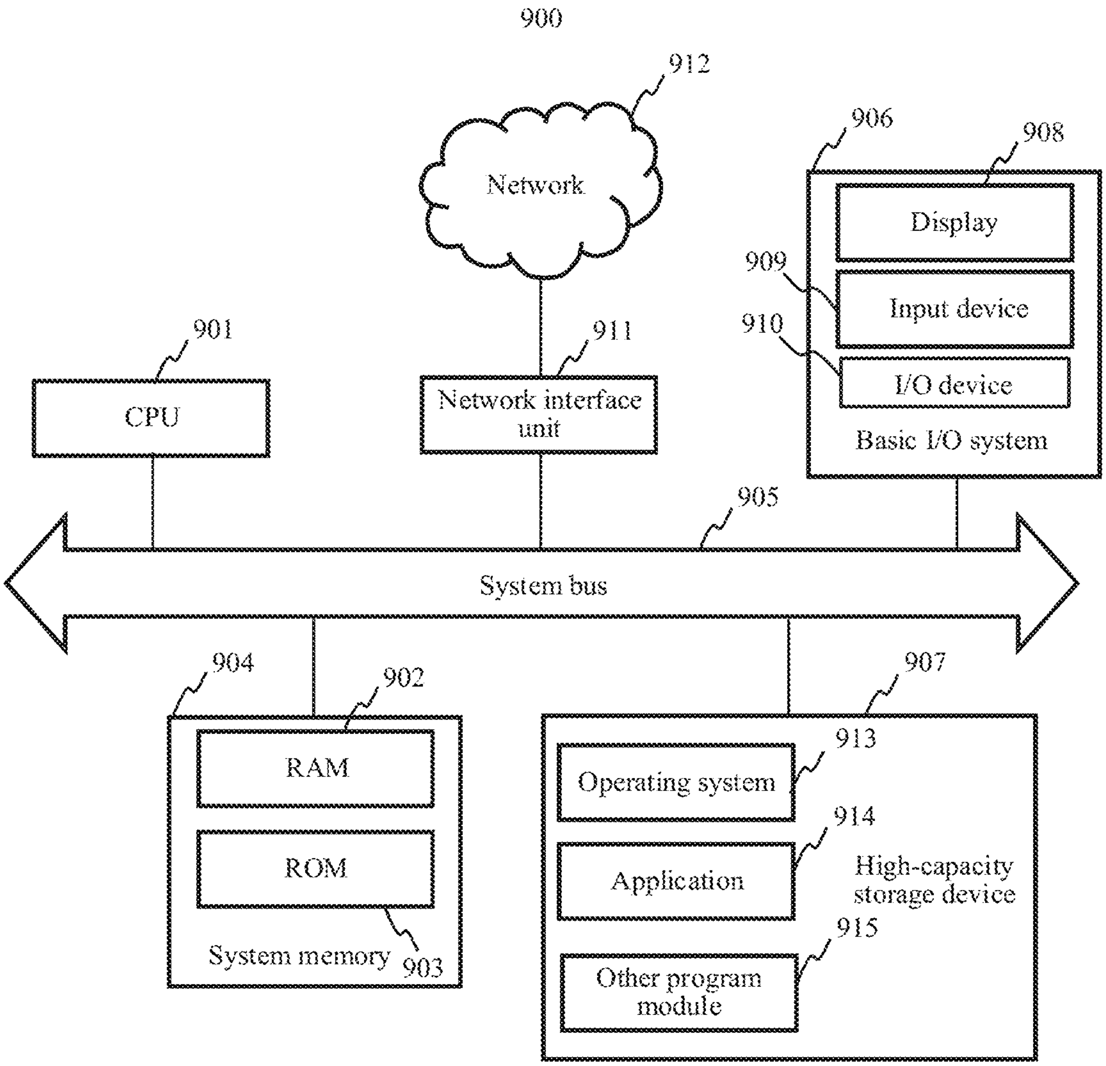
FIG. 16 is a structural block diagram of a computer device according to an exemplary embodiment.

FIG. 16 is a structural block diagram of a computer device according to an exemplary embodiment. The computer device may be implemented as an audio signal processing device in the above-mentioned solutions of this application. The computer device 900 includes a central processing unit (CPU) 901, a system memory 904 including a random access memory (RAM) 902 and a read-only memory (ROM) 903, and a system bus 905 connecting the system memory 904 to the CPU 901. The computer device 900 further includes a basic input/output system (I/O system) 906 configured to transmit information between components in the computer, and a mass storage device 907 configured to store an operating system 913, an application 914, and another program module 915.

The basic input/output system 906 includes a display 908 configured to display information and an input device 909 such as a mouse and a keyboard for a user to input information. The display 908 and the input device 909 are both connected to the central processing unit 901 through an input/output controller 910 connected to the system bus 905. The basic I/O system 906 may further include the I/O controller 910 for receiving and processing input from a plurality of other devices such as a keyboard, a mouse, an electronic stylus, or the like. Similarly, the input/output controller 910 further provides output to a display screen, a printer, or other types of output devices.

According to the various embodiments of this application, the computer device 900 may further be connected, through a network such as the Internet, to a remote computer on the network for running. That is, the computer device 900 may be connected to a network 912 by using a network interface unit 911 connected to the system bus 905, or may be connected to another type of network or a remote computer system (not shown) by using a network interface unit 911.

The memory further includes one or more programs. The one or more programs are stored in the memory. The CPU 901 executes the one or more programs to implement all or some steps of any method shown in FIG. 4 or FIG. 7.

An embodiment of this application also provides a non-transitory computer-readable storage medium, configured to store a computer software instruction for the above-mentioned computer device, including a program designed for performing the above-mentioned audio signal processing method. For example, the computer-readable storage medium may be a ROM, a RAM, a CD-ROM, a magnetic tape, a floppy disk, and an optical data storage device.

An embodiment of this application also provides a non-transitory computer-readable storage medium having stored therein at least one instruction, at least one segment of program, code set or instruction set which is loaded and executed by a processor to implement all or part of the steps in the audio signal processing method introduced above.

An embodiment of this application also provides a computer program product or computer program, including a computer instruction stored in a computer-readable storage medium. A processor of a computer device reads the computer instruction from the computer-readable storage medium. The processor executes the computer instruction such that the computer device performs the audio signal processing methods provided in the above-mentioned implementations.

Other embodiments of this application can be readily figured out by a person skilled in the art upon consideration of the specification and practice of the disclosure here. This application is intended to cover any variations, uses or adaptive changes of this application. Such variations, uses or adaptive changes follow the general principles of this application, and include well-known knowledge and conventional technical means in the art that are not disclosed in this application. The specification and the embodiments are considered as merely exemplary, and the scope and spirit of this application are pointed out in the following claims.

It is to be understood that this application is not limited to the precise structures described above and shown in the accompanying drawings, and various modifications and changes can be made without departing from the scope of this application. The scope of this application is subject only to the appended claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs group operation processing and/or transmitting. In practical application, the foregoing functions may be allocated to and completed by different functional modules according to requirements, that is, an inner structure of a device is divided into different functional modules to implement all or a part of the functions described above.

What is claimed is:

1. An audio signal processing method performed by an electronic device, the method comprising:

obtaining audio signals collected by different microphones in a microphone array;

filtering the audio signals using a first filter to obtain a first target beam, wherein the first filter is configured to suppress an interference speech in the audio signals and enhance a target speech in the audio signals;

filtering the audio signals using a second filter to obtain a first interference beam, wherein the second filter is configured to suppress the target speech and enhance the interference speech;

obtaining a second interference beam of the first interference beam using a third filter, wherein the third filter is configured to perform a weighted adjustment on the first interference beam;

determining a difference between the first target beam and the second interference beam as a first audio processing output; and adaptively updating at least one of the second filter and the third filter; and updating the first filter according to the updated second filter and/or the third filter.

2. The method according to claim 1, wherein the first filter corresponds to a first weight matrix, the second filter corresponds to a second weight matrix, and the third filter corresponds to a third weight matrix; and updating the first filter according to the updated second filter and/or the third filter comprises:

calculating, after the updating, the first weight matrix according to the second weight matrix and the third weight matrix, and updating the first filter according to the first weight matrix.

3. The method according to claim 2, wherein calculating, after the updating, the first weight matrix according to the second weight matrix and the third weight matrix comprises:

determining, after the updating, a product of the second weight matrix and the third weight matrix as a target matrix; and determining a difference between an identity matrix and the target matrix as the first weight matrix.

4. The method according to claim 1, wherein adaptively updating at least one of the second filter and the third filter comprises at least one of:

updating the second filter according to the first target beam, and updating the third filter according to the first audio processing output;

updating the second filter and the third filter according to the first audio processing output;

updating the second filter according to the first target beam;

updating the second filter according to the first audio processing output; or updating the third filter according to the first audio processing output.

5. The method according to claim 1, wherein filtering, by the first filter, the audio signals to obtain the first target beam comprises:

first filtering the audio signals using a pre-filter to obtain a target pre-beam, the pre-filter is a filter calculated using training data and is configured to suppress the interference speech and enhance the target speech; and second filtering the target pre-beam using the pre-filter to obtain the first target beam.

6. The method according to claim 5, further comprising:

acquiring the training data collected by the microphone array in an application environment, the application environment is a spatial range where the microphone array is placed and used, and the training data comprising sample audio signals collected by different microphones in the microphone array; and obtaining the pre-filter by calculating the training data according to a linearly constrained minimum-variance (LCMV) criterion.

7. The method according to claim 1, wherein the microphone array comprises n target directions, wherein n is a positive integer greater than one, each of the target directions corresponding to a respective filter bank that is configured to process the audio signals by performing the steps of obtaining the audio signals, filtering the audio signals using the first filter, filtering the audio signals using the second filter, obtaining the second interference beam, determining, adaptively updating, and updating.

8. The method according to claim 7, further comprising:

filtering, for the audio signals corresponding to the n target directions, the audio signals using the corresponding filter banks respectively to obtain n first audio processing outputs corresponding to the n target directions; and filtering an $i^{th}$ first audio processing output according to the n−1 first audio processing outputs except the $i^{th}$ first audio processing output to obtain an $i^{th}$ second audio processing output corresponding to an $i^{th}$ target direction, i being a positive integer greater than 0 and less than n; and repeating an operation to obtain second audio processing outputs corresponding to the n target directions respectively.

9. The method according to claim 8, wherein filtering the $i^{th}$ first audio processing output according to the n−1 first audio processing outputs except the $i^{th}$ first audio processing output to obtain the $i^{th}$ second audio processing output corresponding to the $i^{th}$ target direction comprises:

determining the n−1 first audio processing outputs except the $i^{th}$ first audio processing output as an $i^{th}$ interference group;

filtering, by an $i^{th}$ fourth filter corresponding to the $i^{th}$ target direction, the $i^{th}$ interference group to obtain an $i^{th}$ third interference beam, the fourth filter being configured to perform weighted adjustment on the interference group;

determining a difference between the $i^{th}$ first audio processing output and the $i^{th}$ third interference beam as the $i^{th}$ second audio processing output; and updating the $i^{th}$ fourth filter adaptively according to the $i^{th}$ second audio processing output.

10. The method according to claim 7, wherein the respective filter bank is an $i^{th}$ filter bank comprising a pre-filter, obtained by training with training data collected by the microphone array in a $i^{th}$ target direction.

11. An electronic device, comprising:

one or more processors; and memory storing one or more programs, the one or more programs comprising instructions that, when executed by the one or more processors, cause the one or more processors to perform operations comprising:

obtaining audio signals collected by different microphones in a microphone array;

filtering the audio signals using a first filter to obtain a first target beam, wherein the first filter is configured to suppress an interference speech in the audio signals and enhance a target speech in the audio signals;

filtering the audio signals using a second filter to obtain a first interference beam, wherein the second filter is configured to suppress the target speech and enhance the interference speech;

obtaining a second interference beam of the first interference beam using a third filter, wherein the third filter is configured to perform a weighted adjustment on the first interference beam;

determining a difference between the first target beam and the second interference beam as a first audio processing output;

adaptively updating at least one of the second filter and the third filter; and updating the first filter according to the updated second filter and/or the third filter.

12. The electronic device according to claim 11, wherein the first filter corresponds to a first weight matrix, the second filter corresponds to a second weight matrix, and the third filter corresponds to a third weight matrix; and
updating the first filter according to the updated second filter and/or the third filter comprises:
calculating, after the updating, the first weight matrix according to the second weight matrix and the third weight matrix, and
updating the first filter according to the first weight matrix.

13. The electronic device according to claim 12, wherein calculating, after the updating, the first weight matrix according to the second weight matrix and the third weight matrix comprises:
determining, after the updating, a product of the second weight matrix and the third weight matrix as a target matrix; and
determining a difference between an identity matrix and the target matrix as the first weight matrix.

14. The electronic device according to claim 11, wherein adaptively updating the at least one of the second filter and the third filter adaptively comprises at least one of:
updating the second filter according to the first target beam, and updating the third filter according to the first audio processing output;
updating the second filter and the third filter according to the first audio processing output;
updating the second filter according to the first target beam;
updating the second filter according to the first audio processing output; or
updating the third filter according to the first audio processing output.

15. The electronic device according to claim 11, wherein filtering, by the first filter, the audio signals to obtain the first target beam comprises:
first filtering the audio signals using a pre-filter to obtain a target pre-beam, the pre-filter is a filter calculated using training data and is configured to suppress the interference speech and enhance the target speech; and
second filtering the target pre-beam using the pre-filter to obtain the first target beam.

16. The electronic device according to claim 15, the operations further comprising:
acquiring the training data collected by the microphone array in an application environment, the application environment being a spatial range where the microphone array is placed and used, and the training data comprising sample audio signals collected by different microphones in the microphone array; and
obtaining the pre-filter by calculating the training data according to a linearly constrained minimum-variance (LCMV) criterion.

17. The electronic device according to claim 11, wherein the microphone array comprises n target directions, wherein n is a positive integer greater than one, each of the target directions corresponding to a respective filter bank that is configured to process the audio signals by performing the steps of obtaining the audio signals, filtering the audio signals using the first filter, filtering the audio signals using the second filter, obtaining the second interference beam, determining, adaptively updating, and updating.

18. A non-transitory computer-readable storage medium, storing a computer program, the computer program, when executed by one or more processors of a computing device, cause the one or more processors to perform operations comprising:
obtaining audio signals collected by different microphones in a microphone array;
filtering the audio signals using a first filter to obtain a first target beam, wherein the first filter is configured to suppress an interference speech in the audio signals and enhance a target speech in the audio signals;
filtering the audio signals using a second filter to obtain a first interference beam, wherein the second filter is configured to suppress the target speech and enhance the interference speech;
obtaining a second interference beam of the first interference beam using a third filter, wherein the third filter is configured to perform a weighted adjustment on the first interference beam;
determining a difference between the first target beam and the second interference beam as a first audio processing output; and
adaptively updating at least one of the second filter and the third filter; and
updating the first filter according to the updated second filter and/or the third filter.

19. The non-transitory computer-readable storage medium according to claim 18, wherein the first filter corresponds to a first weight matrix, the second filter corresponds to a second weight matrix, and the third filter corresponds to a third weight matrix; and
updating the first filter according to the updated second filter and/or the third filter comprises:
calculating, after the updating, the first weight matrix according to the second weight matrix and the third weight matrix, and
updating the first filter according to the first weight matrix.

20. The non-transitory computer-readable storage medium according to claim 19, wherein the calculating, after the updating, the first weight matrix according to the second weight matrix and the third weight matrix comprises:
determining, after the updating, a product of the second weight matrix and the third weight matrix as a target matrix; and
determining a difference between an identity matrix and the target matrix as the first weight matrix.

* * * * *